(12) United States Patent
Killi et al.

(10) Patent No.: US 12,416,544 B2
(45) Date of Patent: *Sep. 16, 2025

(54) OPTICAL FIBER UNIT, LASER SYSTEM COMPRISING SUCH AN OPTICAL FIBER UNIT, AND METHOD FOR EVALUATING AN INPUT COUPLING QUALITY OF THE INPUT COUPLING OF USEFUL LIGHT INTO SUCH AN OPTICAL FIBER UNIT

(71) Applicant: TRUMPF Laser GmbH, Schramberg (DE)

(72) Inventors: Alexander Killi, Trossingen (DE); Aleksander Budnicki, Waldkirch (DE); Stefan Baumbach, Oberwolfach (DE)

(73) Assignee: TRUMPF LASER GMBH, Schramberg (DE)

( * ) Notice: Subject to any disclaimer, the term of this patent is extended or adjusted under 35 U.S.C. 154(b) by 181 days.

This patent is subject to a terminal disclaimer.

(21) Appl. No.: 18/295,858

(22) Filed: Apr. 5, 2023

(65) Prior Publication Data

US 2023/0258529 A1   Aug. 17, 2023

Related U.S. Application Data

(63) Continuation of application No. PCT/EP2021/075652, filed on Sep. 17, 2021.

(30) Foreign Application Priority Data

Oct. 9, 2020   (DE) .................... 10 2020 212 817.0

(51) Int. Cl.
*G01M 11/00* (2006.01)
*B23K 26/70* (2014.01)
*G02B 6/42* (2006.01)

(52) U.S. Cl.
CPC .......... *G01M 11/31* (2013.01); *B23K 26/705* (2015.10); *G02B 6/4214* (2013.01); *G02B 6/4227* (2013.01)

(58) Field of Classification Search
CPC ... G01M 11/31; B23K 26/705; G02B 6/4214; G02B 6/4227; G02B 6/262; G02B 6/4225; G02B 6/4296
See application file for complete search history.

(56) References Cited

U.S. PATENT DOCUMENTS 4,927,226 A * 5/1990 Ortiz, Jr. ............. B23K 26/0673
398/91
4,978,190 A   12/1990 Veith
(Continued)

FOREIGN PATENT DOCUMENTS

DE   102018205800 A1   10/2018
DE   102017114002 A1   12/2018
(Continued)

OTHER PUBLICATIONS

DE_102018114368—translation (Year: 2018).*

*Primary Examiner* — Tarifur R Chowdhury
*Assistant Examiner* — Carlos Perez-Guzman
(74) *Attorney, Agent, or Firm* — LEYDIG, VOIT & MAYER, LTD.

(57) ABSTRACT

An optical fiber unit includes an optical fiber. The optical fiber includes a light guiding region configured for guiding light through the optical fiber, an input coupling end having a first fiber end surface for coupling the light into the light guiding region, and an output coupling end having a second fiber end surface for coupling the light out of the light guiding region. The optical fiber unit further includes a first end piece arranged at one of the input coupling end and the output coupling end. The first end piece is configured to couple the light into the light guiding region or couple the (Continued)

light out of the light guiding region. The first end piece includes a reflection element configured to divert a portion of the light propagating along a direction of propagation through the light guiding region away from the direction of propagation.

18 Claims, 3 Drawing Sheets

(56) References Cited

U.S. PATENT DOCUMENTS

| | | | |
|---|---|---|---|
| 5,096,301 A * | 3/1992 | Stanley | C03C 25/1061 356/73.1 |
| 5,216,729 A | 6/1993 | Berger et al. | |
| 10,630,043 B1 | 4/2020 | Vorontsov et al. | |
| 2011/0305249 A1 | 12/2011 | Gapontsev et al. | |
| 2012/0307251 A1 | 12/2012 | Sanders et al. | |
| 2013/0170791 A1 * | 7/2013 | Kasahara | G02B 6/4286 385/33 |
| 2018/0180803 A1 | 6/2018 | Victor et al. | |
| 2018/0309262 A1 | 10/2018 | Machida et al. | |
| 2019/0039172 A1 | 2/2019 | Grapov et al. | |
| 2020/0249120 A1 | 8/2020 | Miyata et al. | |
| 2020/0271859 A1 * | 8/2020 | Zediker | G02B 6/2551 |

FOREIGN PATENT DOCUMENTS

| | | | |
|---|---|---|---|
| DE | 102018114368 A1 * | 12/2018 | G02B 6/4296 |
| WO | 2006051447 A1 | 5/2006 | |

\* cited by examiner

OPTICAL FIBER UNIT, LASER SYSTEM COMPRISING SUCH AN OPTICAL FIBER UNIT, AND METHOD FOR EVALUATING AN INPUT COUPLING QUALITY OF THE INPUT COUPLING OF USEFUL LIGHT INTO SUCH AN OPTICAL FIBER UNIT

CROSS REFERENCE TO RELATED APPLICATIONS

This application is a continuation of International Application No. PCT/EP2021/075652 (WO 2022/073747 A1), filed on Sep. 17, 2021, and claims benefit to German Patent Application No. DE 10 2020 212 817.0, filed on Oct. 9, 2020. The aforementioned applications are hereby incorporated by reference herein.

FIELD

Embodiments of the present invention relate to an optical fiber unit, a laser system comprising such an optical fiber unit, and a method for evaluating an input coupling quality of the input coupling of useful light into such an optical fiber unit.

BACKGROUND

An optical fiber unit of the type discussed here comprises an optical fiber comprising a light guiding region configured for guiding useful light through the optical fiber and, at a fiber end designated as input coupling end, a first fiber end surface for coupling laser light into the light guiding region. At a fiber end designated as output coupling end, the optical fiber unit comprises a second fiber end surface for coupling laser light out of the light guiding region. At a first fiber end, selected from the input coupling end and the output coupling end, a first end piece is arranged in such a way that laser light can be coupled into the light guiding region or coupled out of the light guiding region through the first end piece.

In the case of such an optical fiber unit, there is the requirement, in principle, to couple laser light into the optical fiber unit via the input coupling end with the highest possible beam quality and the lowest possible losses. In this case, it proves to be difficult for an input coupling quality of the input coupling to be suitably assessed and in particular monitored. It has been proposed to monitor the input coupling quality by capturing leakage light emerging laterally from the optical fiber unit. A power plateau typically forms in that case, however, with the result that a high power is still measured at the detector even when beam quality is poor. This prevents an optimum alignment of the input coupling. It has also been proposed, in the case of optical fiber units comprising a fiber cladding, to capture cladding light propagating in the fiber cladding. This, too, does not allow optimum evaluation of the input coupling quality, however, and moreover is only appropriate if the laser light coupled into the optical fiber unit has higher modes that propagate in the fiber cladding.

SUMMARY

Embodiments of the present invention provide an optical fiber unit includes an optical fiber. The optical fiber includes a light guiding region configured for guiding light through the optical fiber, an input coupling end having a first fiber end surface for coupling the light into the light guiding region, and an output coupling end having a second fiber end surface for coupling the light out of the light guiding region. The optical fiber unit further includes a first end piece arranged at one of the input coupling end and the output coupling end. The first end piece is configured to couple the light into the light guiding region or couple the light out of the light guiding region. The first end piece includes a reflection element configured to divert a portion of the light propagating along a direction of propagation through the light guiding region away from the direction of propagation.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
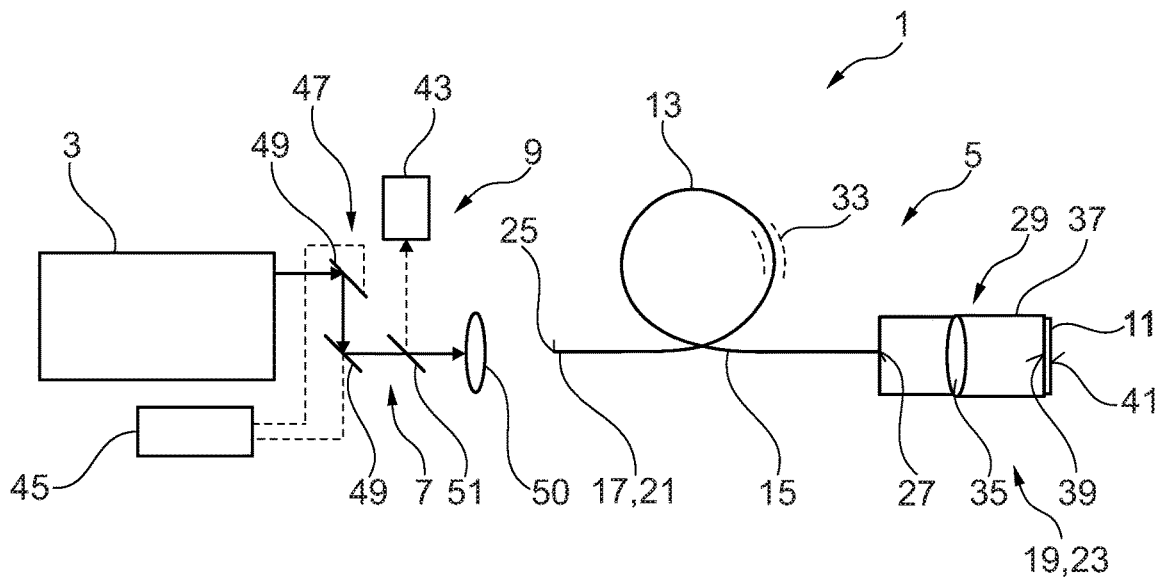
FIG. 1 shows a schematic illustration of a first exemplary embodiment of a laser system with a first exemplary embodiment of an optical fiber unit.

Embodiments of the present invention provide an optical fiber unit configured in such a way that the first end piece comprises a reflection element configured to divert a portion of useful light propagating along a direction of propagation through the light guiding region away from the direction of propagation. A stable and reproducible evaluation of the input coupling quality is possible in this way, with the result that in particular a regulated power and also a constant beam quality for the useful light can be ensured. The formation of a power plateau is avoided, in particular, with the result that a corresponding measurement is actually also sensitive to the beam quality.

A fiber end surface is understood here to mean in particular an imaginary or physical surface which delimits the optical fiber in the direction of its longest extent, i.e. its longitudinal direction, which coincides in particular with the direction of propagation of the useful light propagating in the optical fiber. The fiber end surface can also be a partial surface of an end surface arrangement composed of a plurality of end surfaces. In a preferred configuration, the fiber end surface is a fiber end facet.

The direction of propagation is in particular a direction along which the laser light propagates proceeding from a laser radiation source. The indication "in the direction of propagation upstream of" an element denotes a location which photons of the useful light propagating in the direction of propagation pass through at a time before the element to which the indication relates. Accordingly, the indication "in the direction of propagation downstream of" an element denotes a location which photons propagating in the direction of propagation pass through at a time after the referenced element.

The end piece is in particular connected to the assigned fiber end, in particular secured to the fiber end, preferably by welding or adhesive bonding.

Useful light is understood here to mean in particular light which propagates as intended on a predetermined beam path leading from a laser radiation source through the light guiding region as far as a light target location. In this case, the light target location is in particular a location at which the useful light is applied as intended, for example on or at a workpiece which is irradiated, for example welded or cut, with laser light. In particular, useful light is such light which propagates as intended along the direction of propagation through the light guiding region. In particular, useful light is the sum of all photons or light rays which would pass through the light guiding region in the event of undisturbed propagation, irrespective of whether—in the direction of propagation—they are still arranged upstream of the light guiding region, in the light guiding region or downstream of the light guiding region and/or are branched off. For the qualification of light as a portion of the useful light, it is accordingly irrelevant whether the light has actually already passed through the light guiding region; rather, it is sufficient that the light would pass through the light guiding region as intended if it were not diverted by the reflection element, for example. In particular, a portion of the useful light can be diverted in the direction of propagation upstream of the light guiding region or else downstream of the light guiding region. In particular, useful light is such light which, in the case where the optical fiber unit is used in a laser processing machine, propagates in particular proceeding from the laser radiation source of the laser processing machine along the beam path leading through the light guiding region to a workpiece as light target location. In particular, the useful light is not cladding light and not leakage light.

According to some embodiments, the optical fiber includes a cladding region extending around the light guiding region in a circumferential direction. The light guiding region is in particular a fiber cladding or part of a fiber cladding. Such a cladding region can advantageously increase the efficiency of the light guiding within the optical fiber. Particularly depending on the modes of the laser light coupled into the optical fiber, it is possible for cladding light to occur in the cladding region. What is important is that irrespective of whether cladding light occurs in the cladding region, in accordance with the teaching proposed here what is used for evaluating the input coupling quality is not the cladding light, but rather a portion of the useful light propagating through the light guiding region.

In some embodiments, at a second fiber end, selected from the output coupling end and the input coupling end, a second end piece is arranged in such a way that laser light can be coupled into the light guiding region or coupled out of the light guiding region through the second end piece. In this case, the second fiber end is different than the first fiber end. In other words, for example, if the first fiber end is the output coupling end, then the second fiber end is the input coupling end, and vice versa. In accordance with the development proposed here, the optical fiber thus advantageously comprises a respective end piece at both fiber ends. Depending on the configuration of the end piece, the usability of the optical fiber with regard to the input coupling and output coupling of laser light and/or the mechanical connection of the optical fiber to further elements is improved as a result.

In some embodiments, the first end piece is arranged at the output coupling end. The reflection element is configured to couple a reflection of the useful light back into the light guiding region counter to the direction of propagation. At the fiber output of the optical fiber, a reflection is thus generated which is coupled into the optical fiber again, returns in the latter counter to the direction of propagation and can finally be measured as a back-reflection spatially in the direction of propagation upstream of the fiber input coupling. Said back-reflection can then advantageously be used to align the input coupling in respect of power. In this case, it is advantageous that no power plateau forms during the power measurement of the light coupled back. The input coupling quality can thus be determined reproducibly and with very high accuracy. The measurement is in particular also sensitive to a deteriorated beam quality.

This capture of the back-reflection advantageously makes possible, in particular, with a purely passive collimation module, the implementation of an alignment mode for optimizing the input coupling state, a mode monitoring of the expected output-coupled laser mode indirectly by way of the back-reflection, and a laser power regulation by measurement of the back-reflection.

Alternatively, it is preferably provided that the first end piece is arranged at the input coupling end, wherein the reflection element is configured to divert a reflection of the useful light away from a beam axis of the useful light at a first specific angle. In this case, accordingly, the reflection is generated at the fiber input; in particular, the reflection is therefore not coupled into the light guiding region. This configuration is therefore less susceptible with regard to a highly accurate positioning of the reflection element, but in return is also less sensitive in regard to capturing the input coupling quality. Nevertheless, with this configuration, too, the input coupling quality can be captured reproducibly with high accuracy, the formation of a power plateau also being avoided.

In some embodiments, the first end piece is arranged at the output coupling end, wherein the—first—reflection element is configured to couple a reflection of the useful light back into the light guiding region counter to the direction of propagation. The second end piece is arranged at the input coupling end and comprises a further, second reflection element, wherein the further reflection element is configured to divert a reflection of the useful light away from a beam axis of the useful light at a first specific angle. This configuration combines the two configurations described above and thus advantageously makes possible a particularly comprehensive and accurate evaluation of the input coupling quality. If a measurement reflection element is additionally provided as well, or if the second reflection element acts as a measurement reflection element, wherein the measurement reflection element is configured to guide light guided back through the light guiding region away from the beam path of the useful light at a second predetermined angle, in particular in the direction of a measuring device, advantageously process monitoring—as described below—can additionally be implemented as well. In a preferred configuration, the light guided back through the light guiding region and guided away by the measurement reflection element is process light which allows an evaluation of the work process carried out with the useful light; however, the light guided back can—alternatively or additionally—also be the reflection of the first reflection element, with the result that the guiding away thereof to a measuring instrument is then advantageously integrated into the optical fiber unit. "Guiding away" is understood to mean in particular—particularly in the case of a partly transparent deflection element or measurement reflection element and depending on the undisturbed beam path of the useful light—"transmitting" or "diverting".

In some embodiments, the first end piece is arranged at the output coupling end, wherein the reflection element is configured to couple a reflection of the useful light back into the light guiding region counter to the direction of propagation. The second end piece is arranged at the input coupling end and comprises a measurement reflection element configured to divert the reflection of the useful light, said reflection being guided back through the light guiding region, away from a beam axis of the useful light at a second specific angle, in particular in the direction of a measuring device. In order to be able to capture the reflection of the useful light, said reflection being guided back through the light guiding region, for the evaluation of the input coupling quality, said reflection has to be directed onto a measuring device. In the case of the configuration described here, this diversion is advantageously integrated, in the form of the measurement reflection element, into the optical fiber unit itself, and so there is no need for a further, additional optical set-up, for example a mirror or the like. Furthermore, this measurement reflection element can advantageously be aligned fixedly and stably in the delivery state of the optical fiber unit, with the result that the optical fiber unit can be used particularly simply for the evaluation of the input coupling quality, without additional alignment outlay being incurred.

However, the measurement reflection element can—alternatively or additionally—advantageously also be used to implement a process monitoring of the work process carried out with the useful light. In this case, in particular, a ratio of incident light power to returning light power can serve as a measure of the reaction from the process. The measurement reflection element is then advantageously configured to guide away process light guided back through the light guiding region in particular in the direction of a measuring device.

In some embodiments, the first end piece comprises an optical beam shaping element for the beam shaping of the useful light, wherein the reflection element is arranged in addition to the optical beam shaping element at the first end piece. Such a beam shaping element can be for example a lens, in particular collimation lens or diverging lens, a diffractive optical element, a waveplate, an axicon, or a wedge. In the case of the configuration proposed here, therefore, a back-reflection of the beam shaping element is not used, rather a separate reflection element is provided, which is provided in particular specifically for generating the back-reflection. A beam shaping element typically comprises a high-quality antireflection coating. By contrast, the reflection element preferably comprises an antireflection coating of reduced quality at least on one surface, in order to be able to reflect back a larger proportion of the useful light than the beam shaping element.

In some embodiments, the reflection element is secured to the first end piece nonreleasably. A stable construction for the reproducible evaluation of the input coupling quality can thus be ensured. In particular, the reflection element is connected to the first end piece preferably monolithically, in particular thermally stably. In particular, the reflection element is connected to the first end piece misalignment-stably, i.e. in particular stably against misalignment. What is explained here about the reflection element and the first end piece preferably also applies, mutatis mutandis, to the second end piece and the further, second reflection element. The nonreleasable securing is preferably effected by welding or adhesive bonding, in particular laser welding, in particular ultrashort pulse glass welding. Preferably, the nonreleasable connection is water- and/or gas-tight.

In a preferred configuration, the reflection element is secured to the end piece in a manner mediated by way of a securing tube. In particular, it is possible for the reflection element to be connected to the securing tube by way of a sphere-cone connection. In this case, the securing tube preferably comprises a conical inner surface, wherein the reflection element comprises a sphere-segment-shaped outer surface by which it bears against the conical inner surface of the securing tube. In this way, the reflection element can be oriented, in particular aligned, relative to the securing tube prior to fixing. The securing tube is preferably a glass tube.

In some embodiments, the reflection element is designed as an element selected from a group consisting of: a plane-parallel plate, a window, and a beam shaping element. The beam shaping element is preferably in particular a lens, in particular a collimation lens or output coupling lens or diverging lens, a diffractive optical element, a waveplate, an axicon, or a wedge. If the reflection element is a plane-parallel plate or a window, it is preferably provided in addition to a beam shaping element. If the reflection element is a beam shaping element, in an advantageous configuration, the function of generating the back-reflection can be concomitantly performed by the beam shaping element that is provided anyway, in particular. The optical fiber unit can thus be designed particularly compactly.

In some embodiments, the optical fiber is designed as a hollow core photonic crystal fiber (HC PCF). Alternatively, the optical fiber is preferably designed as a photonic band gap fiber. Alternatively, the optical fiber is preferably designed as an antiresonant fiber (antiresonant coupling fiber). In particular, the optical fiber is preferably designed as a tubular fiber. Alternatively, the optical fiber is preferably designed as an inhibited coupling fiber, in particular as a Kagomé fiber. Such fibers are suitable in particular for guiding ultrashort pulses, hence for ultrashort pulse applications such as ultrashort pulse welding, for example. Preferably, at the same time the reflection element is secured to the end piece nonreleasably, in particular monolithically, in particular thermally stably.

Particular preference is given to a configuration of the optical fiber unit in which the optical fiber is designed as a hollow core fiber, wherein at the same time the reflection element is secured to the end piece nonreleasably, in particular monolithically, in particular thermally stably.

In some embodiments, the at least one end piece, selected from the first end piece and the second end piece, is designed as an end cap. In a preferred configuration, the end piece is designed as a hollow end cap. This configuration is particularly advantageous in combination with an optical fiber designed as a hollow core fiber or some other optical fiber suitable for ultrashort pulse applications, since the hollow end cap can then be used for the input coupling of the very high laser intensities into the light guiding region without risk of impairment or even destruction. Such an end cap is preferably a glass element, in the case of a hollow end cap, a hollow glass element, in particular a glass tube, preferably with an end-face terminating plate composed of glass, which is preferably connected, in particular cohesively connected, preferably welded or adhesively bonded, particularly preferably ultrashort pulse glass-welded, to the optical fiber, likewise comprising glass or consisting of glass. The end cap can be designed as a ferrule, in particular. In a preferred configuration, it is also possible for the end piece to be designed as an end cap with a supplementary piece. In this case, a supplementary piece is also applied to the actual end cap or is fitted to the end cap, wherein the supplementary piece comprises or carries the reflection element. The supplementary piece can be in particular a tube, in particular a glass tube. In a preferred configuration, the supplementary piece is cohesively connected to the end cap, in particular by welding or adhesive bonding, particular preferably ultrashort pulse glass welding.

Alternatively, it is preferably possible for the end piece to be designed as a plug, in particular an OW plug or OW plug connector, or an LLC plug or LLC plug connector. This constitutes an especially compact configuration of the optical fiber unit.

In some embodiments, the reflection element is provided with a first antireflection coating having a first reflectance at a front end face with respect to the direction of propagation of the useful light. The reflection element is provided with a second antireflection coating having a second reflectance at a rear end face with respect to the direction of propagation of the useful light. The first reflectance is greater than the second reflectance. Consequently, it is advantageously possible, on the one hand, to generate a back-reflection that is sufficiently intensive for controlling the input coupling, but at the same time, on the other hand, to prevent the reflection element from having overall an unnecessarily low transmission and thus disadvantageously attenuating the useful light. In other words, in an advantageous configuration, a trade-off between generating a meaningful back-reflection, on the one hand, and a transmission of the useful light with the least possible attenuation, on the other hand, is achieved, in particular. In accordance with one preferred configuration, the reflectance at the front end face is increased in particular in comparison with antireflection coatings typically used, in order to generate a defined back-reflection that is usable for a meaningful measurement of the input coupling quality. At the rear end face, by contrast, the reflection element preferably has a reflectance that is customary for antireflection coatings, with the result that advantageously power losses are minimized, in particular unnecessary power losses are avoided. With preference, the first reflectance is from at least 0.1% to at most 2%, preferably from at least 0.3% to at most 2%, preferably from at least 0.1% to at most 1%, preferably from at least 0.5% to at most 1%, preferably from at least 0.1% to at most 0.5%. The second reflectance is with preference at most 0.2%, preferably at most 0.1%.

Embodiments of the present invention also provide a laser system including a laser radiation source configured for emitting useful light. The laser system additionally includes an optical fiber unit according to embodiments of the invention or an optical fiber unit according to one of the exemplary embodiments described above. The laser system further includes a coupling device configured to couple the useful light into the optical fiber unit. The laser system furthermore comprises a measuring device configured to capture the portion of the useful light diverted by the reflection element. In particular, the advantages that have already been explained in connection with the optical fiber unit are realized in connection with the laser system. In particular, by means of the measuring device that captures the portion of the useful light diverted by the reflection element, it is possible reproducibly and stably to capture the input coupling quality in particular also taking account of the beam quality, in particular without the formation of a power plateau.

Accordingly, in a preferred configuration, the measuring device is configured to evaluate the input coupling quality of the input coupling of the useful light into the optical fiber unit on the basis of the captured portion of the useful light. In particular, the advantages already described are thereby realized.

The measuring device preferably includes a light measuring device configured to capture a light power and/or a mode profile of the captured portion of the useful light, and/or an angle deviation from a predetermined angle which ought to be formed as intended between a beam path of the captured portion of the useful light and the direction of propagation.

Particularly if the reflection element is arranged at the output coupling end, such that the reflection of the useful light is coupled back into the light guiding region counter to the direction of propagation and is subsequently captured upstream of the fiber input by the light measuring device, the light measuring device is preferably configured to capture the light power and/or the mode profile of the reflection. In particular, an alignment mode for optimizing the input coupling state, a mode monitoring and/or a laser power regulation can be realized in this way. The reflection element is preferably arranged, in particular preferably secured fixedly and stably, in particular monolithically, at the output coupling end in such a way that the reflection is coupled exactly into the light guiding region, such that the reflection is transported back to the input coupling end again by the optical fiber. With the aid of the measurement of the reflection, in particular the input coupling can then be aligned, preferably optimized.

Particularly if the reflection element is arranged at the input coupling end and the reflection is thus generated upstream of the optical fiber and does not return through the optical fiber, the light measuring device is preferably configured to capture an angle deviation from a predetermined angle, wherein a beam path of the captured portion of the useful light ought to form the predetermined angle as intended with the direction of propagation. It is assumed here that a reflection with a well-defined angle of its propagation direction, that is to say of the beam path, with respect to the direction of propagation is generated in the case of correct alignment of the input coupling and fixed, stable, in particular monolithic, arrangement of the reflection element at the input coupling end. If the input coupling is then misaligned, an angle deviation from this predetermined, well-defined angle arises, such that the input coupling quality can be evaluated on the basis of capturing this angle deviation.

The light measuring device is preferably designed as a camera. This allows an accurate measurement of the position of the reflection in the image plane of the camera.

Alternatively, the light measuring device is preferably designed as a photodiode, preferably with a stop disposed upstream, or as a quadrant diode. In this way, the position of the reflection and thus the input coupling quality can be evaluated very accurately—if appropriate in particular more cost-effectively than with a camera.

If the reflection element is arranged at the output coupling end and the optical fiber unit does not itself comprise a measurement reflection element or a further reflection element for the output coupling of the back-reflected reflection, the measuring device preferably comprises a separate measuring mirror, partly transparent mirror, or some other suitable optical deflection element, in order to guide the reflection onto the light measuring device.

It is also possible for an additional optical deflection element, in particular a beam splitter, to be used instead of the measurement reflection element, in order that the further portion of the useful light incident in the direction of propagation is guided away on the input coupling side in the direction of the light measuring device, or an aligning mirror is designed in partly transparent fashion for this purpose.

The partly transparent aligning mirror can additionally or alternatively also be used to transmit the reflection coming from the reflection element to the light measuring device.

In some embodiments, the measuring device comprises a control device, wherein the coupling device comprises a controllable aligning device configured to align the input coupling of the useful light into the optical fiber unit. The control device is operatively connected to the aligning device and is configured to control the aligning device depending on the captured portion of the useful light. In this way, in particular an automatic or automated, preferably also permanent, alignment of the input coupling, with the alignment proceeding in particular in real time, and thus in particular readjustment of the input coupling quality are advantageously possible. In a preferred configuration, the aligning device comprises two motorized mirror holders, which can be controlled by means of the control device in such a way that the input coupling of the useful light into the optical fiber unit is optimized. Alternatively or additionally, it is preferably possible for the aligning device to comprise an alignable, i.e. in particular adjustable, input coupling lens.

In some embodiments, the measuring device is additionally configured to capture a further portion of the useful light, said further portion being guided away from the beam path of the useful light before the input coupling into the optical fiber unit. The measuring device is furthermore configured to evaluate a processing process carried out using the useful light with the laser system on the basis of the captured portion of the useful light or process light and the captured further portion of the useful light. In this way, in particular, a process monitoring can be carried out, wherein a ratio of incident light power to returning light power is preferably considered as a measure of a reaction from the process. Furthermore, a rapid shutdown can preferably be carried out if returning light is expected but none can be detected. In particular, an optical fiber break monitoring can be realized in this way. The process monitoring described here proves to be particularly advantageous in combination with a reflection element secured monolithically, in particular thermally stably, since the process monitoring can thus be carried out particularly stably and reproducibly.

Embodiments of the present invention further provide a method for evaluating an input coupling quality of the input coupling of useful light from a laser radiation source into an optical fiber unit, wherein a laser system according to embodiments of the invention or a laser system according to one of the exemplary embodiments described above is used in the context of the method. In particular, the advantages that have already been described above in connection with the laser system are realized in connection with the method in this case.

In the context of the method, in particular, a portion of the useful light diverted by the reflection element of the optical fiber unit is captured, wherein the input coupling quality is evaluated on the basis of the captured portion of the useful light.

Preferably, the emission of the useful light is prevented if an intensity of the captured portion of the useful light falls below a predetermined threshold value.

Preferably, in this case, a light power and/or a mode profile of the captured portion of the useful light are/is captured, and/or an angle deviation from a predetermined angle which ought to be formed as intended between a beam path of the captured portion of the useful light and the direction of propagation is captured.

Preferably, the input coupling of the useful light into the optical fiber unit is automatically aligned on the basis of the captured portion of the useful light.

Preferably, a further portion of the useful light is captured, said further portion being guided away from the beam path of the useful light before the input coupling into the optical fiber unit. In this case, a processing process carried out using the useful light with the laser system is preferably evaluated on the basis of the captured portion of the useful light or process light and on the basis of the captured further portion of the useful light.

FIG. 1 shows a schematic illustration of a first exemplary embodiment of a laser system 1, which includes a laser radiation source 3 for emitting useful light and also a first exemplary embodiment of an optical fiber unit 5. The laser radiation source 3 is designed in particular as a laser, preferably as an ultrashort pulse laser. The laser system 1 additionally includes a coupling device 7 for coupling the useful light into the optical fiber unit 5. The laser system 1 furthermore includes a measuring device 9 configured to capture a portion of the useful light diverted by a reflection element 11 of the optical fiber unit 5. The measuring device 9 is preferably configured to assess an input coupling quality of the input coupling of the useful light into the optical fiber unit 5 on the basis of the captured reflection of the useful light.

The optical fiber unit 5 includes an optical fiber 13 comprising a light guiding region 15 configured for guiding useful light through the optical fiber 13 and, at a first fiber end 17, which is an input coupling end 21, a first fiber end surface 25 for coupling laser light into the light guiding region 15 and, at a second fiber end 19, which is an output coupling end 23, a second fiber end surface 27 for coupling laser light out of the light guiding region 15.

At a first fiber end 17, 19, selected from the input coupling end 21 and the output coupling end 23, a first end piece 29 is arranged in such a way that laser light can be coupled into the light guiding region 15 or coupled out of the light guiding region 15 through the first end piece 29. The first end piece 29 includes the reflection element 11 configured to divert a portion of the useful light propagating along its direction of propagation through the light guiding region 15 away from the direction of propagation. This diverted portion of the useful light can ultimately be captured by the measuring device 9 and advantageously used for evaluating the input coupling quality. In this case, in particular, a very stable and reproducible evaluation of the input coupling quality is possible, wherein the beam quality is also captured, in particular, wherein the formation of a power plateau is avoided, in particular.

In a preferred configuration, the optical fiber 13 includes a cladding region 33 extending around the light guiding region 15 in a circumferential direction, said cladding region merely being indicated schematically here.

The first end piece 29 is arranged at the output coupling end 23 in the case of the exemplary embodiment illustrated here. The reflection element 11 is configured to couple the reflection of the useful light back into the light guiding region 15 counter to the direction of propagation.

The first end piece 29 additionally includes an optical beam shaping element 35, here in the form of a lens, in particular a collimation lens. The optical beam shaping element 35 is provided for the beam shaping of the useful light, in particular for coupling the latter out of the light guiding region 15 and for collimating the useful light. The reflection element 11 is arranged in addition to the optical beam shaping element 35 at the first end piece 29.

The reflection element 11 is preferably secured to the first end piece 29 nonreleasably, in particular by welding or adhesive bonding, preferably water- and/or gas-tightly, wherein preferably the reflection element 11 is secured to the first end piece 29 in a manner mediated by way of a securing tube 37.

The reflection element 11 here is preferably designed as a plane-parallel plate. Alternatively, it is possible for the reflection element 11 to be designed as a window.

The optical fiber 13 is preferably designed as a hollow core photonic crystal fiber, as a photonic band gap fiber, as an antiresonant fiber, in particular a tubular fiber, or as an inhibited coupling fiber, in particular a Kagome fiber.

In the case of the first exemplary embodiment illustrated here, the end piece 29 is preferably designed as an end cap, in particular as a hollow end cap. In particular, the end piece 29 is designed as an end cap with a supplementary piece, wherein in particular the securing tube 37 is the supplementary piece. Alternatively, it is possible for the end piece 29 to be designed as a plug, in particular an OW plug or OW plug connector, or an LLC plug or LLC plug connector.

The reflection element 11 is preferably provided with a first antireflection coating having a first reflectance at a front end face 39 with respect to the direction of propagation of the useful light. The reflection element 11 is provided with a second antireflection coating having a second reflectance at a rear end face 41 with respect to the direction of propagation of the useful light. The first reflectance is greater than the second reflectance. Preferably, the reflectance at the front end face 39 is increased in particular in comparison with antireflection coatings typically used, in order to generate a defined back-reflection that is usable for a meaningful measurement of the input coupling quality. At the rear end face 41, by contrast, the reflection element 11 preferably has a reflectance that is customary for antireflection coatings, with the result that advantageously power losses are minimized, in particular unnecessary power losses are avoided. With preference, the first reflectance is from at least 0.1% to at most 2%, preferably from at least 0.3% to at most 2%, preferably from at least 0.1% to at most 1%, preferably from at least 0.5% to at most 1%, preferably from at least 0.1% to at most 0.5%. The second reflectance is with preference at most 0.2%, preferably at most 0.1%.

The measuring device 9 preferably includes a light measuring device 43 configured to capture a light power and/or a mode profile of the captured portion of the useful light. In a preferred configuration, the light measuring device 43 is designed as a camera or as a photodiode.

In addition, the measuring device 9 preferably includes a control device 45. The coupling device 7 preferably includes a controllable aligning device 47 for aligning the input coupling of the useful light into the optical fiber unit 5. The control device 45 is operatively connected to the aligning device 47 and is configured to control the aligning device 47 depending on the captured portion of the useful light. In a preferred configuration, the aligning device 47 includes two motorized mirror holders 49, which can be controlled by the control device 45 for an automatic alignment of the input coupling. Alternatively, an input coupling lens 50 can also be designed to be settable, in particular alignable, and controllable by the control device 45 for an automatic alignment of the input coupling.

In the case of the exemplary embodiment illustrated here, the measuring device 9 additionally also includes an optical deflection element 51 in order to deflect the portion of the useful light reflected back by the reflection element 11 onto the light measuring device 43. In a particularly simple configuration, the deflection element 51 can be designed as a measuring mirror, wherein suitable coating of a front side and a rear side of the deflection element 51 ensures that the useful light can pass through the measuring mirror with almost no reduction in the direction of propagation, but the back-reflection is directed with sufficient intensity onto the light measuring device 43. In particular, preferably, 99% of the useful light is transmitted in the direction of propagation, and a proportion of 1% of the back-reflection is reflected onto the light measuring device 43. In an alternative configuration, the deflection element 51 can also be designed as a thin-film polarizer, wherein a λ/2 plate (not illustrated here) rotates the polarization of the back-reflection on the return path.

Figure 2:
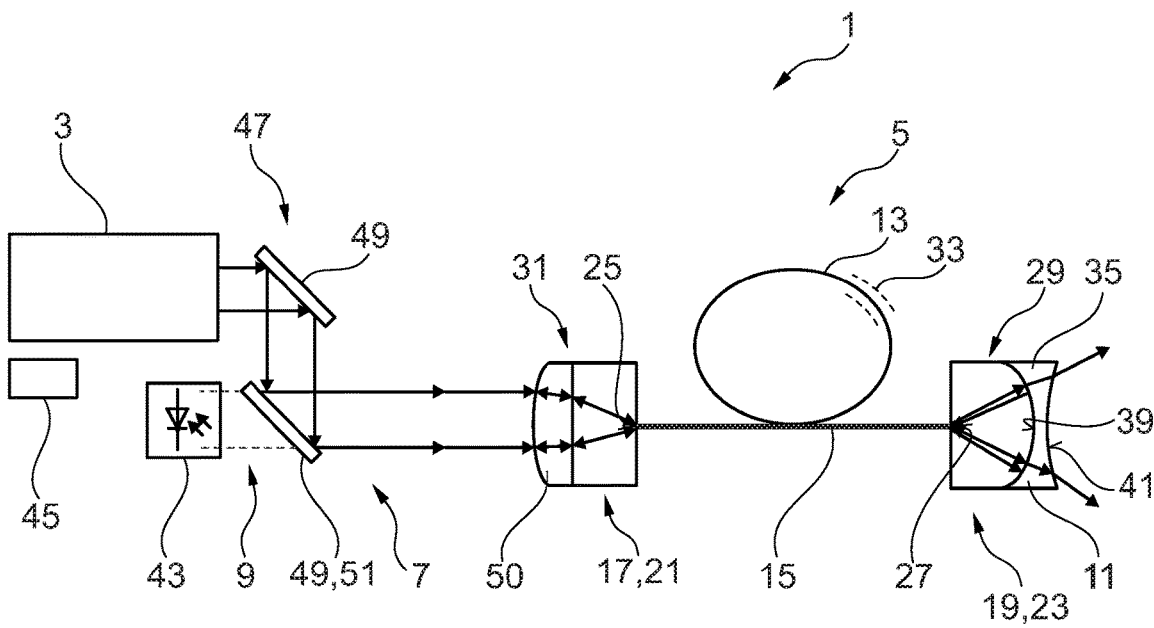
FIG. 2 shows a schematic illustration of a second exemplary embodiment of a laser system with a second exemplary embodiment of an optical fiber unit.

FIG. 2 shows a schematic illustration of a second exemplary embodiment of the laser system 1 with a second exemplary embodiment of the optical fiber unit 5. Elements that are the same and functionally the same are provided with the same reference signs in all of the figures, and so to this extent reference is respectively made to the foregoing description.

In the case of this second exemplary embodiment of the optical fiber unit 5, the reflection element 11 is designed as a beam shaping element 35, in particular as a lens, here in particular as a diverging lens. There is then no need for a separate reflection element 11, with the result that this configuration is particularly compact. The beam shaping element 35 can alternatively also be designed as a collimation lens, as a diffractive optical element, as a waveplate, as an axicon, or as a wedge.

In addition, a second end piece 31 is arranged at a second fiber end 17, 19, selected from the input coupling end 21 and the output coupling end 23, here at the input coupling end 21. Laser light can be coupled into the light guiding region 15 through the second end piece 31.

The deflection element 51 is formed particularly compactly here by a partly transparent aligning mirror held in the second mirror holder 49. However, it can also be provided separately from and in addition to the latter.

The deflection element 51 can additionally be used to capture a measure of the input-coupled power by means of an additional light measuring device for process monitoring purposes. The process monitoring is explained in greater detail in association with FIG. 3.

Figure 3:
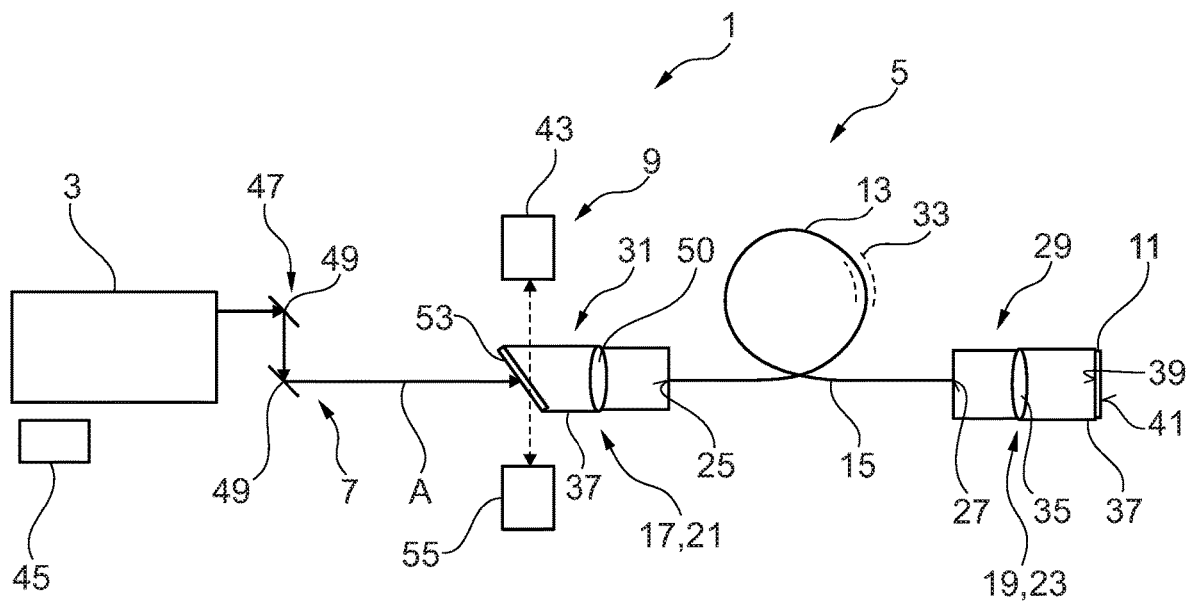
FIG. 3 shows a schematic illustration of a third exemplary embodiment of a laser system with a third exemplary embodiment of an optical fiber unit.

FIG. 3 shows a schematic illustration of a third exemplary embodiment of the laser system 1 with a third exemplary embodiment of the optical fiber unit 5. As in the case of the first exemplary embodiment, here the first end piece 29 is arranged at the output coupling end 23, and the reflection element 11 is configured to couple a reflection of the useful light back into the light guiding region 15 counter to the direction of propagation. In addition, however, the second end piece 31 is arranged at the input coupling end 21 and the second end piece 31 includes a measurement reflection element 53 configured to divert the reflection of the useful light, said reflection being guided back through the light guiding region 15, away from a beam axis A of the useful light at a specific angle, referred to here as second angle, in particular in the direction of the measuring device 43. In particular there is no need for the optical deflection element 51, and so this configuration is particularly compact.

Moreover, a reflection of the useful light incident in the direction of propagation can additionally also be diverted on the input coupling side in the direction of an additional light measuring device 55 by the measurement reflection element 53.

However, the measurement reflection element 53 can also be used to carry out a process monitoring by means of process light being captured by the light measuring device 43. At the same time, a measure of the input-coupled power can be captured by means of the additional light measuring device 55, wherein a comparison of the captured process light power with the input-coupled power can be used for evaluating the work process. The additional light measuring device 55 is preferably part of the measuring device 9, wherein the measuring device 9 is additionally configured to evaluate the work process accordingly. Accordingly, a comparison between the measured values of the light measuring device 43, on the one hand, and of the additional light measuring device 55, on the other hand, can also be used for optical fiber break monitoring.

Figure 4:
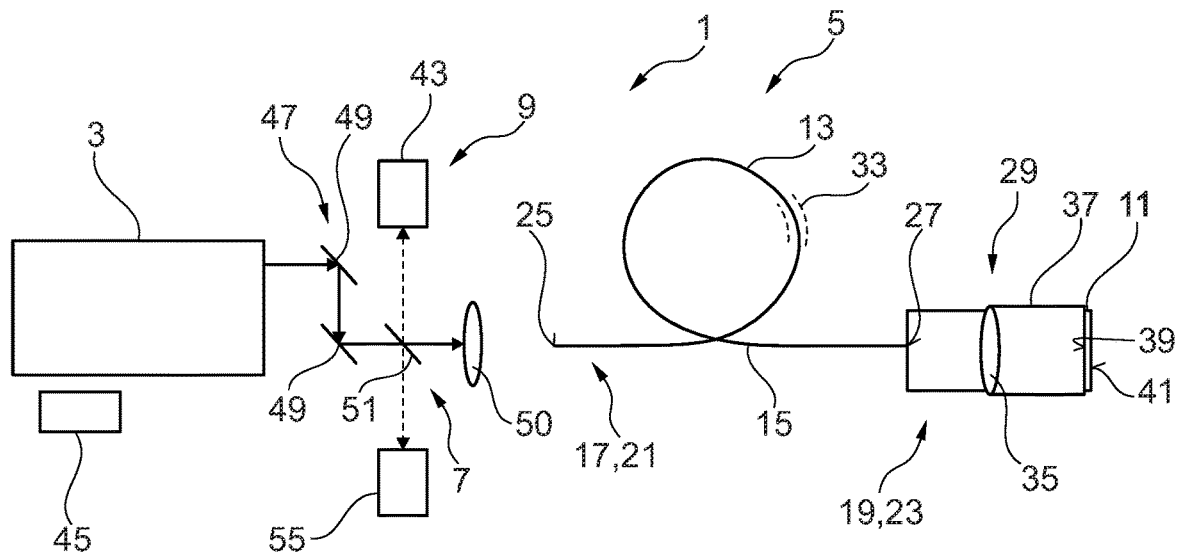
FIG. 4 shows a schematic illustration of a fourth exemplary embodiment of a laser system, here by way of example with the first exemplary embodiment of the optical fiber unit.

FIG. 4 shows a schematic illustration of a fourth exemplary embodiment of the laser system 1, wherein the latter once again includes the first exemplary embodiment of the optical fiber unit 5 in accordance with FIG. 1. In the case of this fourth exemplary embodiment, too, the first end piece 29 is arranged at the output coupling end 23, wherein the reflection element 11 is configured to couple a reflection of the useful light back into the light guiding region 15 counter to the direction of propagation. However, here the optical deflection element 51 is configured such that, besides the function of deflecting the back-reflection onto the light measuring device 43, it also additionally fulfils the function involving a reflection of the useful light incident in the direction of propagation being diverted on the input coupling side in the direction of the additional light measuring device 55. Consequently, the additional functions of a process monitoring and an optical fiber break monitoring can be realized in this exemplary embodiment, too.

Figure 5:
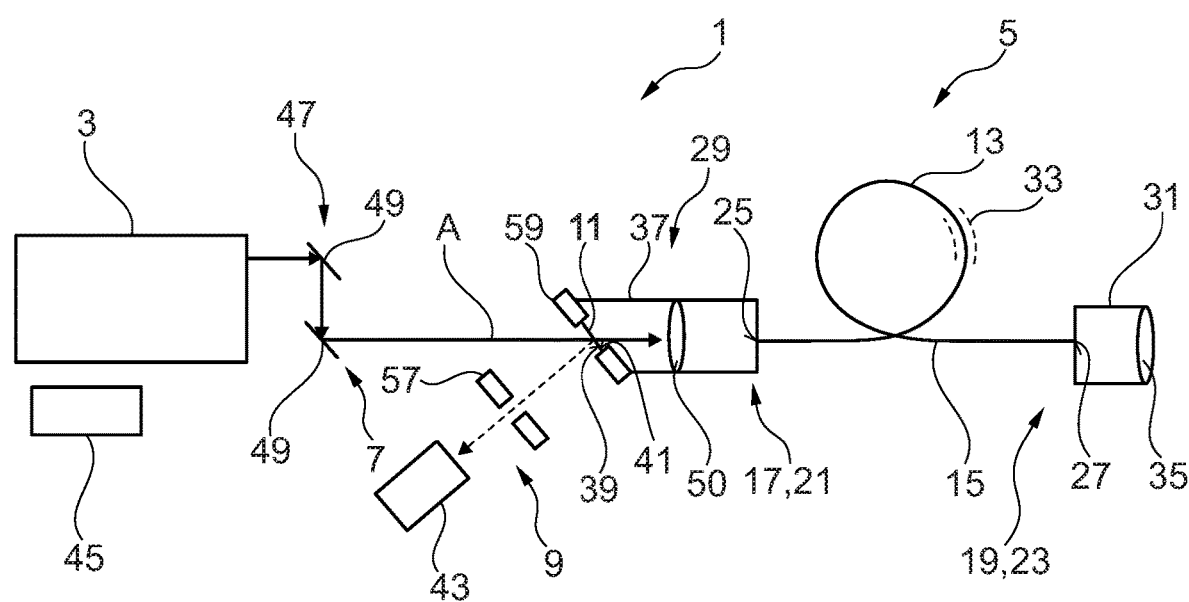
FIG. 5 shows a schematic illustration of a fifth exemplary embodiment of a laser system with a fourth exemplary embodiment of an optical fiber unit.

FIG. 5 shows a schematic illustration of a fifth exemplary embodiment of the laser system 1 with a fourth exemplary embodiment of the optical fiber unit 5. In the case of this exemplary embodiment, the first end piece 29 is arranged at the input coupling end 21, and the reflection element 11 is configured to divert a reflection of the useful light away from the beam axis A at a specific angle, referred to here as first angle. The second end piece 31 is arranged at the output coupling end 23 and includes only the beam shaping element 35, in particular a collimation lens, but no reflection element 11. The light measuring device 43 is designed here preferably as a camera or a photodiode, particularly preferably as a photodiode with a stop 57 disposed upstream, or as a quadrant diode, and is configured in particular to capture a spatial deviation and angle deviation, wherein the beam path of the captured portion of the useful light ought as intended to form the predetermined angle with the direction of propagation, here with the beam axis A, if the input coupling is correctly aligned. A faulty alignment of the input coupling can thus be ascertained in particular by capturing the angle deviation from the predetermined angle. Preferably, a further stop 59 is also arranged in addition at the first end piece 29.

In the context of a method for evaluating the input coupling quality of the input coupling of the useful light from the laser radiation source 3 into the optical fiber unit 5, a laser system 1 according to one of the exemplary embodiments described above is preferably used, wherein the emission of the useful light is preferably prevented if an intensity of the captured portion of the useful light falls below a predetermined threshold value. In this way, in particular, an optical fiber break monitoring can be realized.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optical fiber unit comprising:
    an optical fiber comprising a light guiding region configured for guiding useful light through the optical fiber and a cladding region extending around the light guiding region in a circumferential direction, an input coupling end having a first fiber end surface for coupling the useful light into the light guiding region, and an output coupling end having a second fiber end surface for coupling the useful light out of the light guiding region,
    a first end piece arranged at one of the input coupling end and the output coupling end, the first end piece being configured to couple the useful light into the light guiding region or couple the useful light out of the light guiding region, wherein the first end piece comprises a reflection element configured to divert a portion of the useful light propagating along a direction of propagation through the light guiding region away from the direction of propagation, and
    a measuring device configured to capture the portion of the useful light diverted by the reflection element, and to evaluate an input coupling quality of input coupling of the useful light into the light guiding region of the optical fiber based on the captured portion of the useful light.

2. The optical fiber unit as claimed in claim 1, further comprising a second end piece arranged at another one of the output coupling end and the input coupling end, the second end piece being configured to couple the useful light into the light guiding region or couple the useful light out of the light guiding region.

3. The optical fiber unit as claimed in claim 1, wherein the first end piece is arranged at the output coupling end, wherein the reflection element is configured to reflect the useful light coupled out of the light guiding region so as to be coupled back into the light guiding region counter to the direction of propagation.

4. The optical fiber unit as claimed in claim 1, wherein the first end piece is arranged at the input coupling end, wherein the reflection element is configured to divert the portion of the useful light away from a beam axis of the light at a first angle.

5. The optical fiber unit as claimed in claim 2, wherein the first end piece is arranged at the output coupling end, wherein the reflection element is configured to reflect the useful light so as to be coupled back into the light guiding region counter to the direction of propagation, wherein the second end piece is arranged at the input coupling end and comprises a further reflection element, wherein the further reflection element is configured to divert a second portion of the useful light away from a beam axis of the light at a first angle.

6. The optical fiber unit as claimed in claim 2, wherein the first end piece is arranged at the output coupling end, wherein the reflection element is configured to reflect the useful light so as to be coupled back into the light guiding region counter to the direction of propagation, wherein
the second end piece is arranged at the input coupling end and comprises a measurement reflection element, the measurement reflection element being configured to divert a second portion of the useful light, the second portion of the useful light to be guided back through the light guiding region, away from a beam axis of the light at a second angle, in a direction of a measuring device.

7. The optical fiber unit as claimed in claim 1, wherein the first end piece further comprises an optical beam shaping element for beam shaping of the useful light.

8. The optical fiber unit as claimed in claim 1, wherein the reflection element is nonreleasably secured to the first end piece via a securing tube, by welding or adhesive bonding.

9. The optical fiber unit as claimed in claim 1, wherein the reflection element is configured as an element selected from a group consisting of: a plane-parallel plate, a window, and a beam shaping element, a diffractive optical element, a waveplate, an axicon, and a wedge.

10. The optical fiber unit as claimed in claim 1, wherein the reflection element is configured as a lens.

11. The optical fiber unit as claimed in claim 1, wherein the optical fiber is configured as a hollow core photonic crystal fiber, as a photonic band gap fiber, as an antiresonant fiber, or as an inhibited coupling fiber.

12. The optical fiber unit as claimed in claim 1, wherein the optical fiber is configured as a tubular fiber, or as a Kagomé fiber.

13. The optical fiber unit as claimed in claim 1, wherein the first end piece is configured as
an end cap, or
an end cap with a supplementary piece, or
a plug.

14. The optical fiber unit as claimed in claim 1, wherein the reflection element is provided with a first antireflection coating having a first reflectance at a front end face with respect to the direction of propagation of the light, and a second antireflection coating having a second reflectance at a rear end face with respect to the direction of propagation of the light, and wherein the first reflectance is greater than the second reflectance.

15. A laser system comprising
a laser radiation source for emitting light,
an optical fiber unit as claimed in claim 1, and
a coupling device for coupling the light into the optical fiber unit.

16. The laser system as claimed in claim 15, wherein the measuring device comprises a light measuring device, wherein the light measuring device is configured to capture a light power and/or a mode profile of the captured portion of the useful light, and/or to determine an angle deviation from a predetermined angle between a beam path of the captured portion of the useful light and the direction of propagation.

17. The laser system as claimed in claim 15, wherein the measuring device comprises a controller, wherein the coupling device comprises a controllable aligning device for aligning the input coupling of the light into the optical fiber unit, wherein the controller is operatively connected to the aligning device and is configured to control the aligning device based on the captured portion of the useful light.

18. The laser system as claimed in claim 15, wherein the measuring device is further configured to capture a further portion of the light, the further portion of the light being guided away from a beam path of the light before the input coupling into the optical fiber unit, wherein the measuring device is further configured to evaluate a processing process carried out using the useful light with the laser system based on the captured portion of the useful light and the captured further portion of the light.

* * * * *